United States Patent [19]

Johansen et al.

[11] Patent Number: 4,774,801
[45] Date of Patent: Oct. 4, 1988

[54] HORSE HALTER WITH ATTACHED LEAD LINES

[76] Inventors: Charles F. Johansen, 88 Western Ave., Bath, Me. 04530; Ernest S. Lowell, 85 Temble St., Saco, Me. 04072

[21] Appl. No.: 66,033

[22] Filed: Jun. 24, 1987

[51] Int. Cl.$^4$ .......................... B68B 1/00; B68B 5/06
[52] U.S. Cl. ......................................... 54/34; 54/24; 119/109
[58] Field of Search ................... 119/106, 109; 54/24, 54/34

[56] References Cited

U.S. PATENT DOCUMENTS

| 371,137 | 10/1887 | Grant | 54/24 |
|---|---|---|---|
| 2,929,358 | 3/1960 | Morrow | 119/109 |
| 4,584,967 | 4/1986 | Taplin | 119/109 |

FOREIGN PATENT DOCUMENTS

| 20411 | 12/1882 | Fed. Rep. of Germany | 54/34 |
|---|---|---|---|
| 426613 | 4/1935 | United Kingdom | 119/109 |

Primary Examiner—Robert P. Swiatek
Attorney, Agent, or Firm—Laforest S. Saulsbury

[57] ABSTRACT

A lead line package for horse halters comprising a folded lead line and cover casing adapted to normally hold the lead line folded upon itself. The side edges are joined together by corresponding Velcro areas overlapping one another in front of the folded lead line. Release of the folded line is had by a simple pull of the lead line to separate the Velcro joined side edges to open the cover casing. Such a package carried by the horse with his halter makes a lead line always readily accessible when much in need to lead the horse from a fire. The lead line package may be attached to the halter by stitching the package to one of the halter straps or by the use of snap hooks that can be detachable connected to the metal rings of a halter that join the halter straps together. This package can be adapted for use with dog collars and the lead line can have Velcro means within itself to hold it in a folded state until needed to be freed for use. The halter and package parts will be impregnated with Day Glo material so to be seen in smoke and darkness.

7 Claims, 4 Drawing Sheets

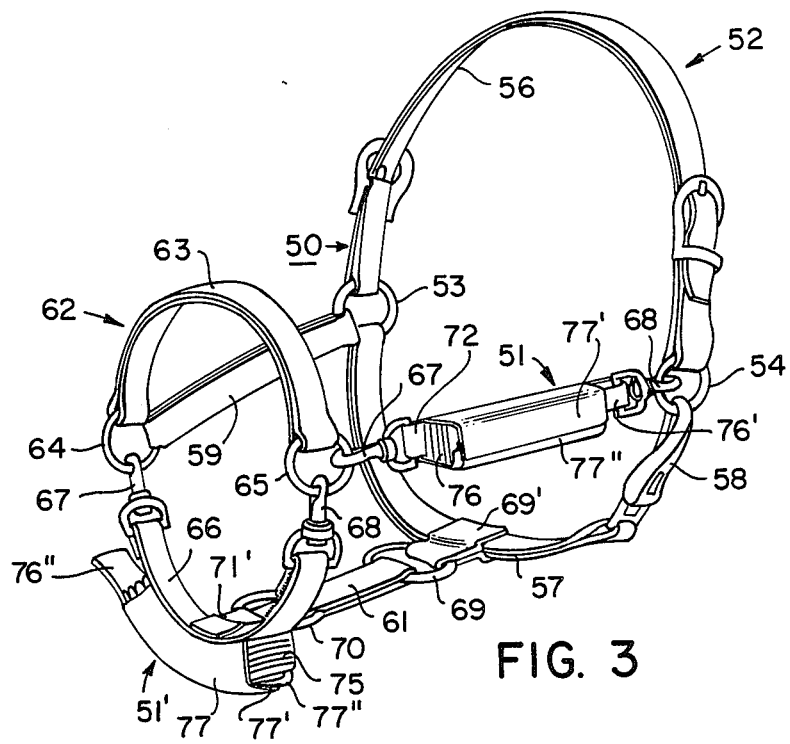
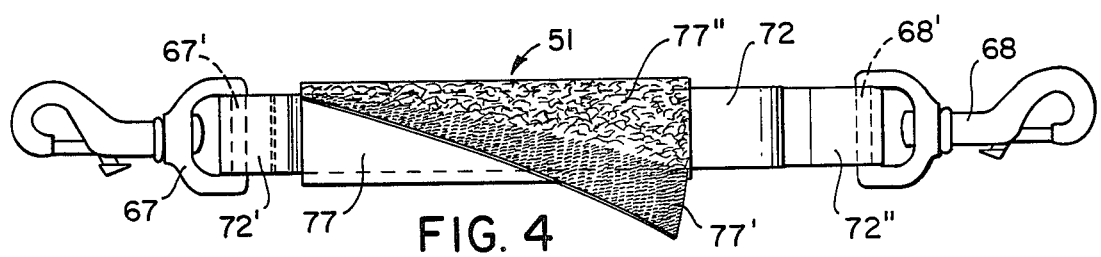
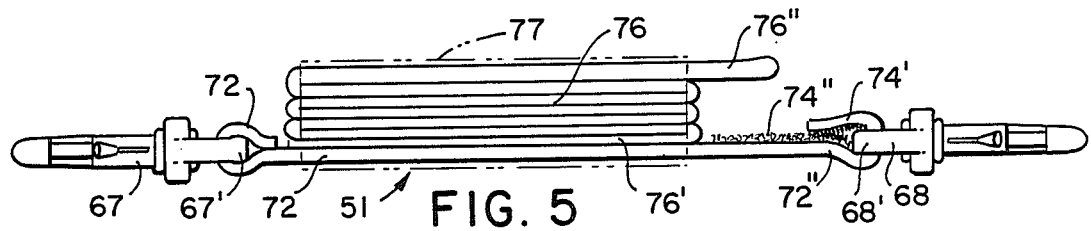
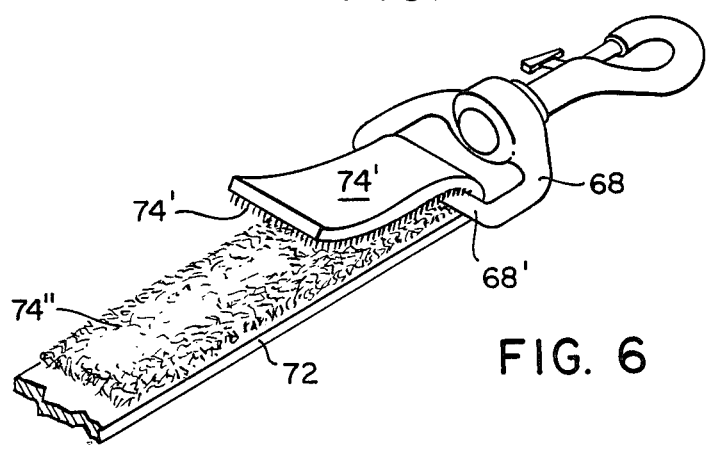

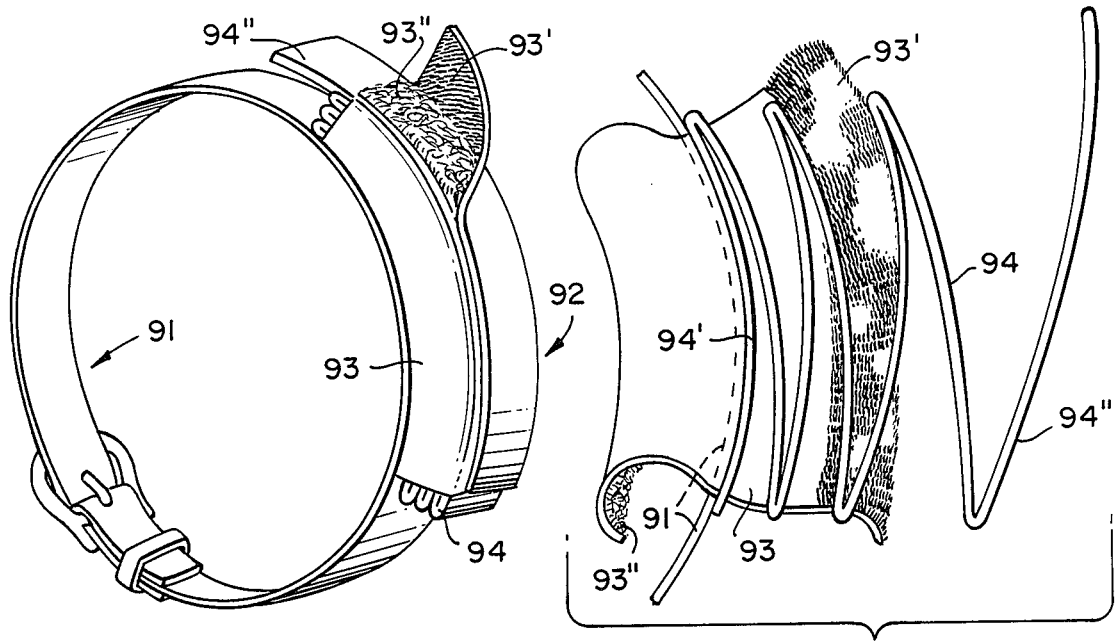
FIG. 11
FIG. 12
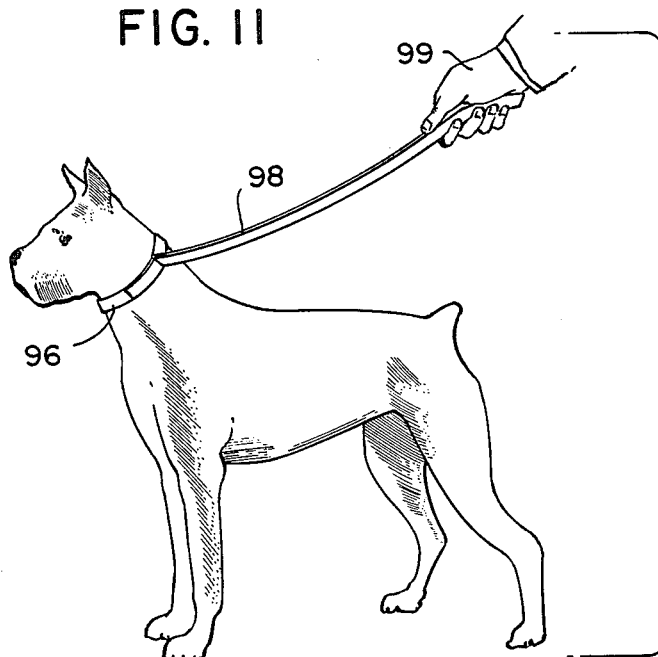
FIG. 15
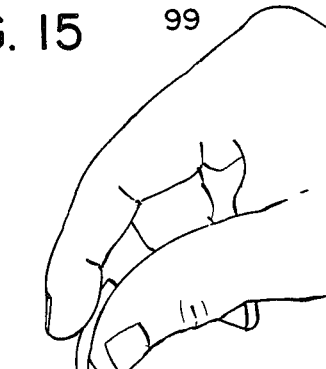
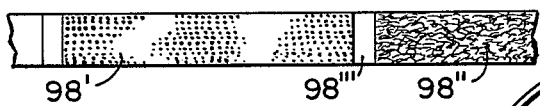
FIG. 14
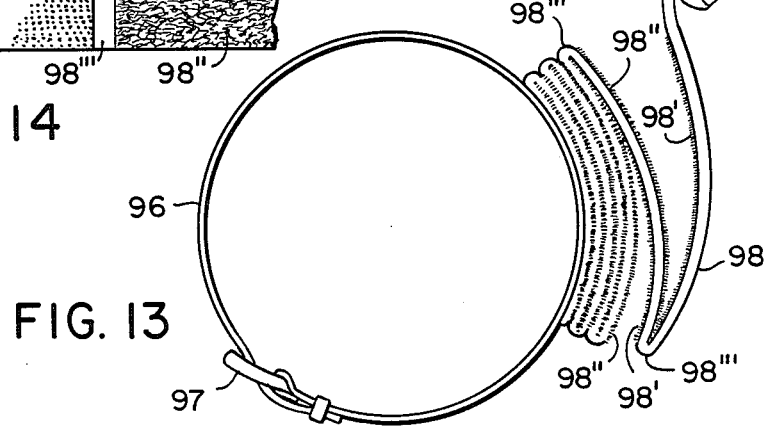
FIG. 13

HORSE HALTER WITH ATTACHED LEAD LINES

This invention relates to a combined animal halter and lead line.

BACKGROUND OF THE INVENTION

In times of horse stable fires, lead lines are not always available for recovering the horses from the raging fire. There are seldom enough lead lines about the stables, only two or three may be, when the horses most need to be removed from the fire. Time is very limited to get the horses out of the stable once the fire has started. A horse will not move from fire and has to be led away to safety. To a horse, a stall is his safe place and he just does not know fire. Before a horse will move, his head has to be turned as by a lead line for his body to follow. If the horse is not pulled or led he will not move from the fire and burns with the stable. A horse, even after taken to safety and released, will often by himself return to his burning stall and be burned. Thus, there is a massive loss of horses when a stable of horses is consumed by fire. Straw and hay are most flammable. There are never enough stablemen and lead lines to pull out the horses. It is only likely that there are only two or three lead lines available in an ordinary stable of ten or more horses. Only one man can lead one horse at a time. That man must first find a lead line in a stable which may already be filled with smoke and then the man in the same smoke must find the horse and his halter strap to attach the lead line. Little can be seen and the man must grapple with smoke and feel his way. It is no place for one to be who is unfamiliar with the stable. Fire is not planned and is sudden. One has intense heat to contend with.

Lead lines are usually lost or misplaced about a stable and in the darkness will be hard to find. Once found the stable man must enter the hot stall and snap the clip hook of the lead line to a hot metal ring of the halter on the horse's head. The metal parts of the halter will have much heat reflected upon them that is a hindrance and makes it difficult to attach the lead line snap hook to them. The attachment must be made without delay to prevent loss of precious seconds. In thirty seconds, another horse can be burned and in a few minutes, an entire barn consumed with all horses. As many as forty horses have been known to be consumed at one fire. Thousands of horses have perished from smoke and flames. An escaped horse runs back in the burning barn and will be consumed by the fire. Aside from the fire and even in an open field it is difficult to snare a horse with an ordinary lead line. The horse will instinctively avoid his trainer or person with a lead line in his hand, lending much difficulty in the capture of the horse.

SUMMARY OF THE INVENTION

All of these remarks show the need for a lead line combined with a halter and always available for use. Accordingly, a combined halter and lead line has been provided by the present invention and wherein the lead line package will have light glow to facilitate the location of the halter and horses head in the smoke filled stable. A halter is made from connecting straps and metal brass rings with straps adapted to be buckled over the head and about the neck and connected by forwardly extending straps connected with a strap that surrounds the nose. The lead line will be a folded-up flat strap that is packaged in a Velcro-sealed cover casing that is stitched to the halter and carried at all times thereby. The package can be fashioned to replace the forward strap connection or can be snapped to a metal ring of the surrounding neck and nose strap parts. The falling lead line will be anchored securely in the end of the cover casing near to the nose strap assembly. Much pull may be needed to turn the horses head after the strap has been taken down from the casing. All horses are trained to lead from the left so the casing and line is put on the left side of the halter. The folded lead line can be easily grasped and pulled from the casing and by which the horses head is pulled to the left and the horse be easily led off. Similiar folded lead line packages with the lead line and with the folded lead line without its casing held only by Velcro-connection has been provided for dog collars. Lead lines for dogs are easily lost and often unavailable. With the present arrangement the dog with a collar will always have a lead line.

It is the main object of the invention to provide a packaged folded lead line that can be made as a part of the horse halter and always be available when needed to lead off the horse from a stable fire.

It is another object of the invention to provide a packaged lead line that is impregnated with a flare substance that penetrates smoke during a stable fire so that horses can be readily located and the halter will be easily seen through the smoke.

It is a further object of the present invention to provide a folded up lead line and package that has a snap hook by which the package can be snap fastened to the halter when in place on the horse's head so that the packaged lead line can be made available for the standard halters on horses in the less accessible or remote stalls of the stable.

It is a further oject of the invention to provide a lead line package for a horse halter or dog collar that cannot be easily dissassembled by the animal while being worn and so that the lead line when folded will not be a disturbance to the animal.

Still further objects of the invention are to provide a packaged foldable lead line, having the above objects in mnd, which is of simple construction, has minimum number of parts, can be easily seen, one in which pulling and release of the lead line will be but a single one direction stroke of the arm, of pleasing appearance, easily maintained, effective and efficient in use.

BRIEF DESCRIPTION OF THE DRAWING

For a better understanding of the invention, reference may be had to the following detailed description taken in connection with accompanying drawing, in which FIG. 3 is a perspective view of a modified horse halter in which the folded lead line package replaces one of the forwardly-extending side straps of the halter and a further lead line package stitch fastened to the nose surrounding straps of the halter, FIG. 4 is an enlarged top view of the snap hook fastened lead line package with the Velcro casing partly opened preparatory to the release of the folded up flat strap lead line retained therein, FIG. 5 is a side view of this snap hook folded lead line package showing in the full lead line folded upon itself but with its Velcro cover shown in phantom.

FIG. 6 is an enlarged perspective view of one end of the snap fastened lead line package illustrated in a manner in which lead line package can be adjusted for length, the same being connected to the spaced portion of the snap hook by Velcro means.

FIG. 11 is a perspective view of a dog collar with a lead line package stitched thereto and the cover partly opened, FIG. 12 is an enlarged perspective exploded view of the lead line package of FIG. 11 with the cover casing fully opened and the lead line freed thereof, FIG. 13 is a frontal view of a dog collar with a lead line formed of a Velcro-faced strap folded upon the collar and partly pulled, FIG. 14 is a plan view of a fragment of the Velcro-faced lead line showing the alternate male and female Velcro pads serving for holding the lead line folds together in a solid like and detachable manner, and FIG. 15 is a perspective view of a dog with the combined collar and lead line of FIG. 13 fully extended to its handle.

DETAILED DESCRIPTION OF THE SEVERAL EMBODIMENTS

Example A

Figure 1:
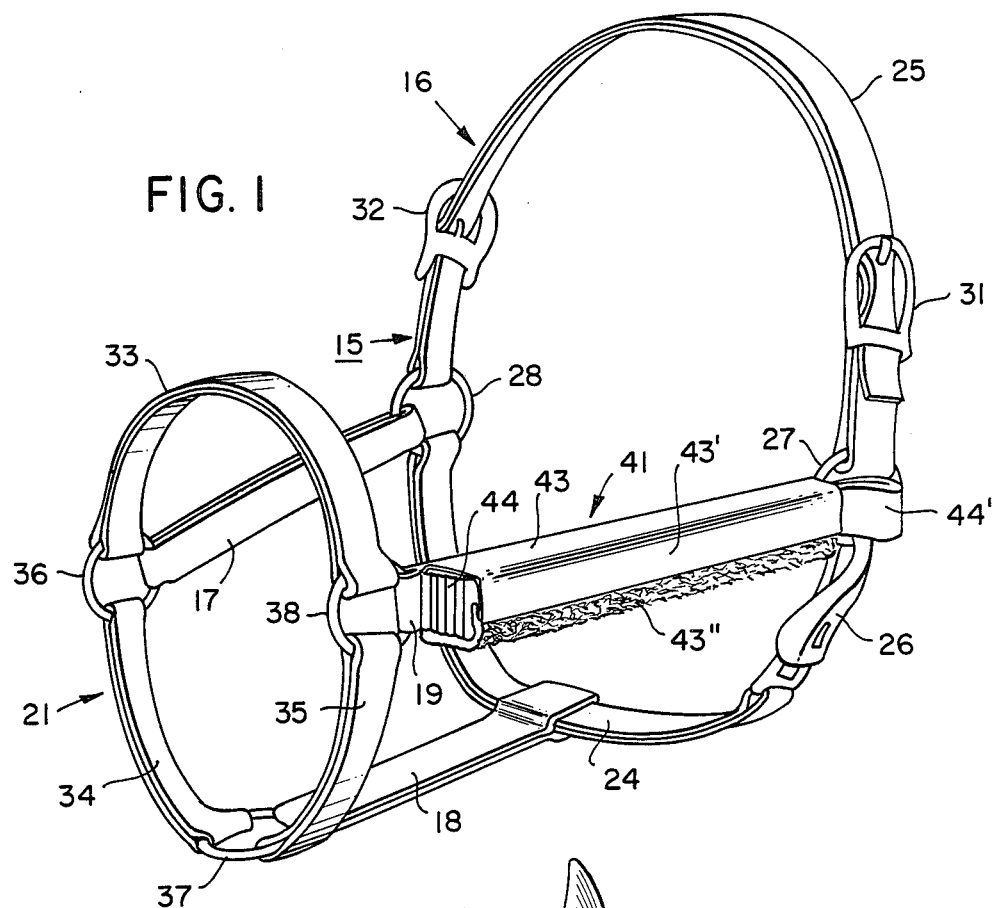
FIG. 1 is a perspective view of a horse halter to which the lead line package has been stitched to a forwardly- extending side strap.
Figure 2:
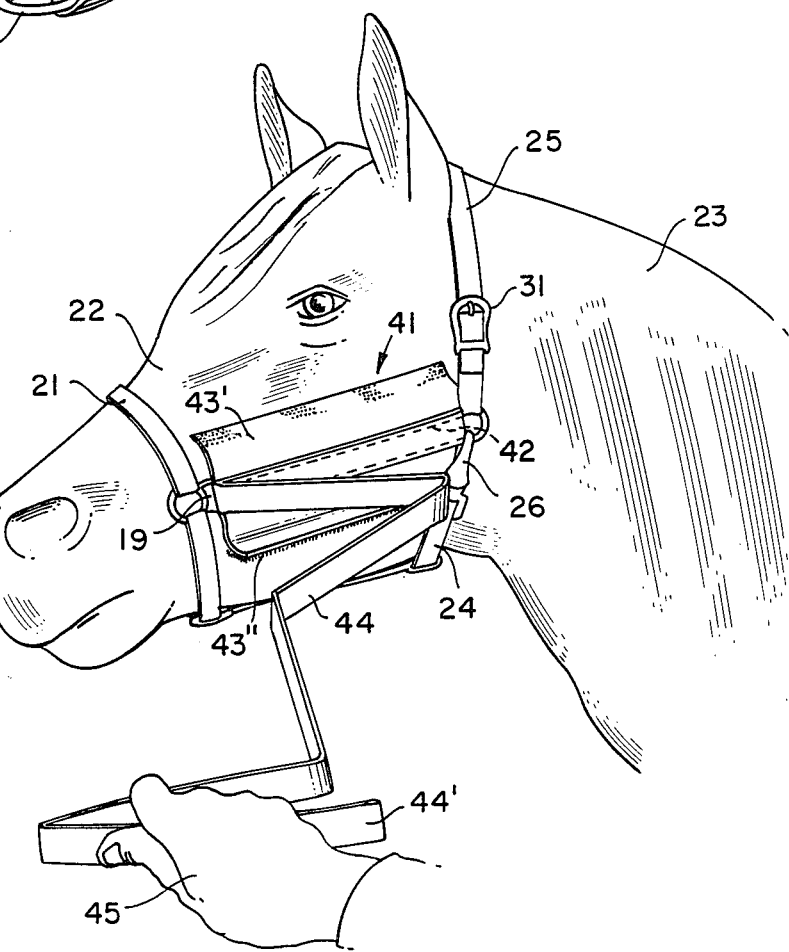
FIG. 2 is a perspective view of the horse halter upon the horse's head and with the lead line having been pulled from the package preparatory to use.
Figure 7:
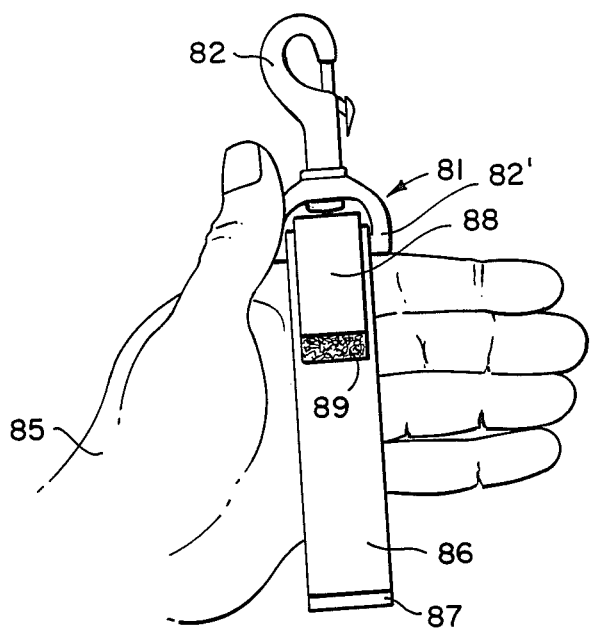
FIG. 7 is an elevational view of another modified form of lead line package in which the package will be supported on the halter by a single snap hook and be hung from any of the metal rings of the halter.

Referring now FIGS. 1 and 2, there is shown a typical horse halter 15 formed of a large buckled neck strap assembly 16, three forward straps 17, 18, and 19 extending forwardly from the neck strap assembly 16 to a nose strap assembly 21. The halter 15 extends over the nose 22 and about neck 23 of the horse, FIG. 2.

Bottom strap part 24 swings down from top strap part 25 and metal ring 28 on release of snap hook 26 from metal ring 27 at the opposite side of assembly 16. The top strap 25 has two straps one upon the other and extends around rings 27 and 28 and is adjustable in length through buckles 31 and 32 to fit the horse's head. Once the buckles are adjusted, opening of the assembly 16 is done by release of the snap hook 26 from the ring 27. To apply the halter, the neck strap assembly 16 is put over the head and onto the neck, and at same time nose strap assembly 21 is pulled onto the horse's nose by the forwardly-extended straps 17, 18 and 19. Then with the snap hook 26 attached to the ring 27 the halter is firmly retained upon the head and neck of the horse, FIG. 2.

The nose strap assembly 21 comprises three straps 33, 34 and 35 doubled upon themselves and looped around three interconnecting metal rings 36, 37 and 38. The forwardly-extending strap 17 is connected between ring 28 of neck strap assembly 18 and ring 38 or nose strap assembly 21. The forwardly-extended strap 18 is looped over bottom double strap 24 of the neck assembly 16 and forwardly connected to ring 37 of the nose strap assembly 21. The forwardly-extended strap 19 extends along the left side of the halter 15 and is connected between ring 27 of neck assembly 16 and ring 38 of the nose strap assembly 21. Since all horses are taught to be led from the left, the best location for the foldable lead line package 41 of the present invention is upon the left side forwardly extended strap 19 to which it is stitched fastened as indicated at 42, FIG. 2. This lead line package 41 comprises an elongated cover casing fabric 43 formed of flexible sheet material such as leather, plastic or canvas that has side ends that will wrap around the assembled lead line 44 folded back and forth upon itself, fold ends being seen in FIG. 1. The flap ends of the cover casing 43 will overlie the front of the assembled lead line 44 and are secured by means of the respective Velcro male and female flaps 43' and 43'' so as to prevent any separation by horse movements while the main part of the lead line is tightly confined within the cover casing 43 and its free end 44' projects from the upper open end of the closed cover casing to be easily accessible in time of emergency or fire to assist the stableman to easily grasp the line and pull down with sufficient force to separate the flaps and free the lead line to unfold, all as illustrated in FIG. 2, and the horse led away by the lead line. When the horse's head is extended to the left by the stableman, the horse will move out. The lead line 44 is preferably made of flat web strap material and impregnated with Day Glo or similar flare material as well as the cover casing 43 so that they will boh be readily observed in smoke and darkness and render the horse more visible. The halter itself may as also be treated with Day Glo material or the like. Every horse in the stable would have the present combined halter and lead line. With the Day Glo material thereon the horse can be easily located in smoke and dark surroundings. Simply with a yank of the lead line, the lead line 44 is made available to lead the horse from the burning stall. Upon a pull of the lead line, the horse will follow. The entire procedure will have been done in haste and with no need to locate a separate lead line.

Example B

In FIG. 3, there is shown a somewhat altered halter 50 which has been adapted for use with a modified form of lead line package indicated generally at 51 and in which one of the strap lengths of the standard halter of FIG. 1 is replaced with the lead line package 51. In this halter 50, a head and neck strap assembly 52 is the same as the head and neck strap assembly 16 of FIG. 1 and formed of metal rings 53 and 54 that join upper and lower strap parts 56 and 57 together. This strap assembly is slipped over the head and neck of the horse upon release of its snap hook 58 from metal ring 54 and hooked when the halter is in place. Forwardly-extending strap 19 of FIG. 1 has been replaced by the modified lead line package 51 to be soon described. A strap 59, lead line package 51 and bottom forwardly-extended strap 61 are all connected forwardly to a nose strap assembly 62 having a top strap part 63, metal rings 64 and 65, and a bottom nose strap part 66. The bottom forwardly-extending strap 61 includes a metal ring 69 and a strap loop 69' connected about the bottom strap 57 of the head and neck assembly 50. The lead line package 51 is connected by a snap hook 67 to ring 65 at the nose assembly and at its other end to ring 54 of the head and neck strap assembly 52 by a snap hook 68. The lead line package 51 thus replaces one of the forwardly-extended straps of the standard halter of FIG. 1 instead of having to be stitched thereto upon the bottom part 66 of nose strap assembly 62.

A lead line package 51' may also be assembled to the nose strap assembly 62, by fastening the snap hooks 67 and 68 respectively to respective metal rings 64 and 65 depending from the top strap part 63. This makes for a good location of the lead line and the pull of the lead line will be from the left the same as with the forwardly-extending lead line package 51. Each of the lead line packages 51 and 51' comprises a web base strap piece 72 to which at one end a swivel hook 67 is secured by a folded over end 72' stitch-fastened about its transverse hook shaft 67'. The opposite end of the web base strap piece 72 is adjustably fitted at 72" around transverse shaft 68' of the snap hook 68 by male and female joined Velcro connection areas 74' and 74". This connection renders the lead line package 51 or 51' adaptable for different lengths of halter strap parts, see FIGS. 4, 5 and 6.

As seen is FIG. 5, a lead line 76 is folded upon itself, several times. Its root end 76' is stitch-fastened to the top face of the base strap piece 72, so as to take strain of the lead line when unfolded and extended by the stableman to pull the horse's head. The top turn of the lead line 76 is extended outwardly to provide a tab portion 76" that will be easily accessible for hand grip to the end of the lead line when the line is needed to remove the horse from a fire. In this form of the invention, the turns of the lead line are normally free for separation and extension and thus must be contained by a cover casing 77 shown in full in FIGS. 3 and 4 but in phantom in FIG. 5.

Such cover casing 77 is stitch-fastened from about the underside of the base strap piece 72 and extends at opposite sides upwardly about the stacked turns of the folded lead line 76 and wrapped over the top turn from which the hand grasp 76' extends. The sides of this cover casing overlie one another and the folded turns of the lead line 76 and are tightly joined to one another by male and female Velcro 77' and 77". The lead line is thus adequately held against any rubbing by the horse with objects that could cause their separation and release of the lead line. Velcro joining is ideal for this purpose.

Separation of the Velcro ends 77' and 77" while normally substantially inseparable, is easily effected with a fast downward pull of the lead line tab extension 76" so that the Velcro cover casing 77 is literally ripped open and the lead line is made instantly available without need for finding a standard lead line by the stableman, to lead off the horse from the stable fire.

Example C

Figure 8:
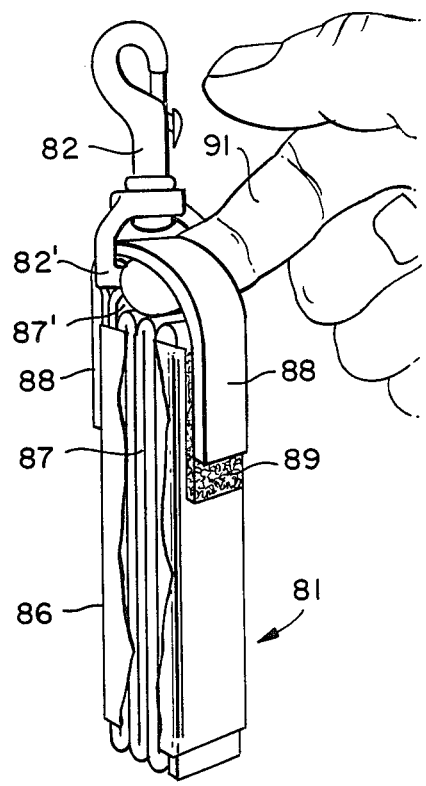
FIG. 8 is a vertical perspective view of the single snap hook lead line package with a portion of the separable casing broken away to show the lead line folded upon itself and the way the cover casing is detachably connected to the snap hook and made free of the snap hook upon being detached.
Figure 9:
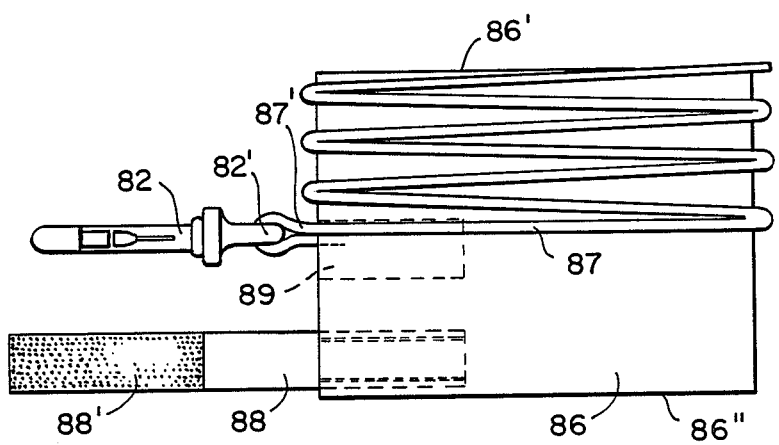
FIG. 9 is a layout of the lead line with its snap hook and the folded lead line spread over the separable cover casing prior to it being snapped about the lead line and detachable connected to the snap hook and releasable to drop the lead line preparatory to its use.
Figure 10:
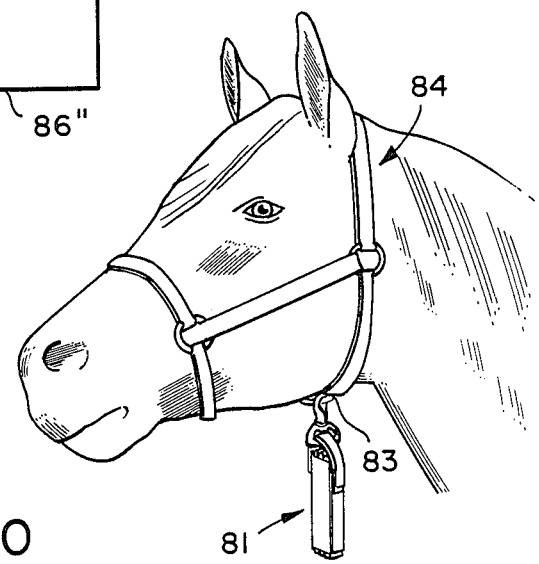
FIG. 10 is a perspective view of a standard horse halter upon a horse's head and with its single snap hook lead line package suspended from one of interconnecting metal rings of the halter.

In FIGS. 7, 8, 9, and 10, there is shown a lead line package 81 with but one swivel snap hook 82 that can be snapped to any of several rings 83 of a horse halter 84, FIG. 10, to depend therefrom and the package 81 accessible from the left of the horse. The lead line package 81 can be grasped by a single hand 85 and easily snapped onto any metal ring 83 of the halter 84. The construction of this lead line package 81 differs from the packages 51 and 51' of FIG. 3 in that only one snap hook 82 is used and that its cover casing 86 is pulled off and free of the lead line 87 so that the line drops by itself. The side ends of the cover casing 86 overlap one another at the front of the folded lead line 87 after the cover has been wrapped around the folded up lead line.

The lead line 87 is anchored to a cross bar portion 82' by a stitched loop end 87'. Stitched to the upper end of cover casing 86 is a Velcro tab 88 that has a male area 88' that will extend through the snap hook 82 over the looped end 87' of the folded lead line 87 for engagement with female pad 89 on the cover casing 86. To assist the cover casing 86 in retaining the folded lead line 87 against dropping through the bottom of the wrapped cover casing 86, the turns of the lead line may be weakly adhered to the cover casing and one another but normally the wrapping of the cover casing should be adequate if done with sufficient tightness. It will be a simple operation to release the lead line B7 as with the other forms of the invention, simply locating a finger 91 of the hand under the tab 88 as illustrated in FIG. 8 upon one yank of the tab 88, this cover 86 is freed of the lead line 87 and is dropped ready for use.

In FIG. 9, it will be seen how the lead line package is assembled. Lead line 87 will have been folded as shown but with the turns tightly stacked upon one another and end 87' fastened directly to the snap hook 82. While retaining the packaged close with the hand, the Velcro tab 88 can be extended through the snap hook 82, over the looped end 87' of the lead line and affixed to Velcro pad 89 at the top of the covering 86. The cover 82 and the line 87 will be impregnated with Day Glo material as it can readily be observed in the smoke and darkness.

Example D

While reference has been directed to the horse halters, it should be readily apparent that this lead line package has equal application for use with dog collars. A dog collar is but a short strap adapted when buckled to fit loosely about the dog's neck. To the outer face of a collar 91 as shown in FIGS. 11 and 12, there is fixed as by stitching a lead line package 92 comprising a cover casing 93 and a folded lead line 94 that are stitch fastened together to the collar 91.

There can be a single stitching through the bottom turn 94' of the lead line 94 and the casing 93. The other turns of the lead line 94 as shown in FIG. 12 will be collapsed upon the bottom turn 94'. A hand grip tab end 94" on a long last turn of the lead line 94 serves to pull the lead line out of the casing from between Velcro joined edges 93' and 93" overlapped with one another normally to hold the stacked turns of the lead line 94 against accidental release of the lead line when the dog is free.

When it is desired to lead the dog, the handler grasps extended tab turn 94" of the lead line 94 and pulls overlapped Velcro side edges 93' and 93" apart to release lead line 94. The lead line will have been folded up within the cover casing with the side edges overlapping and Velcro connected. There will be no losing of a lead line since the dog will always have his collar and line with him.

Example E

In FIGS. 13, 14 and 15, there is shown another dog collar lead line in which the cover casing is omitted and the lead line will of itself be held folded. A collar 96 is retained about the dog's neck by a buckle and carries a folded lead line 98 of webbing especially made to have alternate and corresponding male and female Velcro areas 98' and 98" between folds 98''' extending throughout its length arranged for corresponding areas to be matched so that the overlying turns of the lead line are built up into a solid stack of turns, both side faces of the line 98 arranged to Velcro match as the lead line is folded. The folded line will, in effect, become a mass not easily detached by the dog in his play and scuffle. This lead line 98 will be always available when wanted by the dog's owner or handler. With a quick pull of the top turn of the lead line, the turns of the line can be readily separated in the manner shown in FIG. 13 and extended to its full extent from the dog's collar 96 and in the handler's hand 99. When the dog is again to be made free the lead line can be easily folded and secured in mass by the match of male and female areas of the side faces of the lead line.

It should now be apparent that with all forms of this invention, there has been provided an animal lead line that will be carried by the animal and always available for immediate use as in the case of fire.

While various changes can be made of the detail construction of the invention, it will be understood that such changes will be within the spirit and of the present invention as defined by the appended claims.

What is claimed is:

1. In combination, a leather-like harness adapted to be fastened over the head and neck of the animal, a folded lead line package attached to the leather-like harness including a lead line folded several turns one upon another and in stacked and closed relationship thereto, and a flexible releasable means for normally holding and enclosing the lead line in the stacked and closed relationship of its turns the outer turn of the lead line extending outwardly of the releasable means to be accessible and actionable upon the flexible releasable means when pulled to open the flexible releasable means along a longitudinal access therein, whereby to free the lead lone for use to lead the animal.

2. The combination as defined in claim 1, and a tab extending from the flexible releasable holding means adapted to be pulled independently of the lead line to open the flexible releasable means and free the lead line.

3. The combination as defined in claim 1 and said leather-like harness being in the form of a horse halter, and the horse halter having metal rings joining strap lengths together and said lead line package including a snap hook with a shaft and said folded lead line anchored to the snap hook shaft and said flexible releasable holding means being a cover casing wrapped about the folded lead line to hold the folds together, said cover casing having a tab extending over snap hook shaft and Velcro-joined to the overlying sides of the cover casing whereby release of the lead line will be effected by pulling the tab free of the snap hook to free the lead line from the cover casing.

4. In combination, a leather-line harness adapted to be fastened over the head of an animal, a folded lead line package attached to the leather-like harness inclusing a lead line folded upon itself for holding the lead line in its folded condition with its free outer end accessible to be grasped by a hand to pull the line free of its releasable holding means and extended for use in leading the animal, said holding release means for the lead line comprising a cover casing surrounding the folded lead line with its sides overlying one another and the outer free end of the line, the sides being joined by mating Velcro faces thereof, and these overlying sides of the cover casing being separable upon pulling the lead line through the sides of the cover casing to free the lead line.

5. The combination as defined in claim 1 or 4 and said leather-like harness being in the form of a horse halter having head-neck and nose strap assemblies joined by forwardly-extended straps and said lead line package fixed to one of the forwardly-extended straps.

6. The combination as defined in claim 1 or 4 and said leather-like harness being in the form of a horse halter having head-neck and nose strap assemblies joined together by forwardly extended straps and metal rings, said lead line package including hooks respectively fixed to the opposite ends of the package and metal rings of the head-neck and nose strap assemblies and adapted to replace one of the forwardly-extended straps.

7. The combination as defined in claim 1 or 4 and said leather-like harness being in the form of a horse halter having metal rings joining straps together and said lead line package having a snap hook connected to but one end thereof by which the package may be attached to one of metal rings of the halter and depend therefrom.

* * * * *